US006015948A

United States Patent [19]

Yang

[11] Patent Number: 6,015,948

[45] Date of Patent: Jan. 18, 2000

[54] STRUCTURE OF METRONOME

[76] Inventor: Wei-Tsung Yang, No. 1, Sec. 4, Tzu-Chiang Rd., Sanchung City, Taipei Hsien, Taiwan

[21] Appl. No.: 09/252,472

[22] Filed: Feb. 18, 1999

[51] Int. Cl.[7] .................................................... G09B 15/00

[52] U.S. Cl. ................................................................ 84/484

[58] Field of Search ............................... 84/484, 453, 454

[56] References Cited

U.S. PATENT DOCUMENTS 2,841,950 7/1958 Mlynarski ................................ 84/484

*Primary Examiner*—Robert E. Nappi
*Assistant Examiner*—Shih-yung Hsieh
*Attorney, Agent, or Firm*—Varndell & Varndell, PLLC

[57] ABSTRACT

A metronome in which the actuating member which is driven by a driving mechanism through an escapement wheel to turn a graduated pendulum bar back and forth includes a copper bushing connected to the pendulum bar, 00and a circular plate 0 securely mounted on one end of the copper bushing, the circular plate having a peripheral notch fitted with staggered peripheral rows of sloping teeth at the escapement wheel, and two sloping portions symmetrically disposed at two opposite sides of the peripheral notch, the sloping portions respectively tilted inwards in X-axis direction and sloping backwards in Y-axis direction for striking by the sloping teeth of the escapement wheel alternatively.

1 Claim, 5 Drawing Sheets

STRUCTURE OF METRONOME

BACKGROUND OF THE INVENTION (a) Field of the Invention

The present invention relates to a metronome, and more particularly to an improved structure of metronome that can accurately beat time at a low frequency.

(b) Description of the Prior Art

A regular metronome, as shown in FIG. 1, is generally comprised of a driving mechanism 1, an escapement wheel 2, an oscillating shaft 3, and an actuating member 40. The driving mechanism 1 is turned by the user to wind a spiral power spring 12, causing it to preserve energy for operating the metronome. When the spiral power spring 12 is released, a rotary force is applied to an escapement wheel 2, which has two staggered rows of sloping teeth 21 and 21' around its periphery. When the escapement wheel 2 is rotated, the actuating member 40 is forced to turn an axle 31 of an oscillating shaft 3 back and forth. The oscillating shaft 3 comprises a graduated pendulum bar 32 fixedly perpendicularly connected to one end of the axle 31, a fixed weight 34 at the bottom end of the pendulum bar 32, and a sliding weight 33 slidably mounted on the pendulum bar 32 above the elevation of the axle 31. The actuating member 40 (see FIG. 2) comprises a circular plate 401 having a peripheral notch 402 fitted with the sloping teeth 21 and 21' of the escapement wheel 2. When the escapement wheel 2 is rotated by the driving mechanism 1, the two staggered rows of sloping teeth 21 and 21' are moved with the escapement wheel 2 to pass through the peripheral notch 402 and to alternatively strike the circular plate 401 at two opposite sides of the peripheral notch 402, thereby causing the circular plate 401 to be turned back and forth. When adjusting the time beating frequency, the elevation of the sliding weight 33 is relatively adjusted. When the sliding weight 33 is adjusted upward toward the top limit position at the pendulum bar 32, the moment of arm is relatively increased, and therefore the oscillating speed of the pendulum bar 32 is relatively slowed down. On the contrary, when the sliding weight 33 is adjusted downwards toward the axle 31, the oscillating speed of the pendulum bar 32 is relatively accelerated. However, when the sliding weight 33 is adjusted to the top limit position at the pendulum bar 32, the pendulum bar 32 become unable to be effectively oscillated. Because the circular plate 401 of the actuating member 40 is a flat disk (see FIG. 3), no component of force is produced to push the circular plate 401 sideways when one sloping tooth 21 or 21' strikes the circular plate 401, and the sloping tooth 21 or 21' may pass through the peripheral notch 402 without touching one peripheral edge of the peripheral notch 402 at the circular plate 401 when the sliding weight 33 is adjusted to the top limit position at the pendulum bar 32.

SUMMARY OF THE INVENTION

The present invention has been accomplished to provide a metronome which eliminates the aforesaid problem. According to the present invention, the circular plate of the actuating member comprises a peripheral notch fitted with the staggered rows of sloping teeth at the escapement wheel, and two sloping portions symmetrically disposed at two opposite sides of the peripheral notch, the sloping portions respectively tilted inwards in X-axis direction and sloping backwards in Y-axis direction for striking by the sloping teeth of the escapement wheel alternatively. This design enables a component of force to be produced to push the actuating member sideways when one sloping tooth of the escapement wheel touches the circular plate of the actuating member.

DETAILED DESCRIPTION OF THE PREFERRED EMBODIMENT

Figure 1:
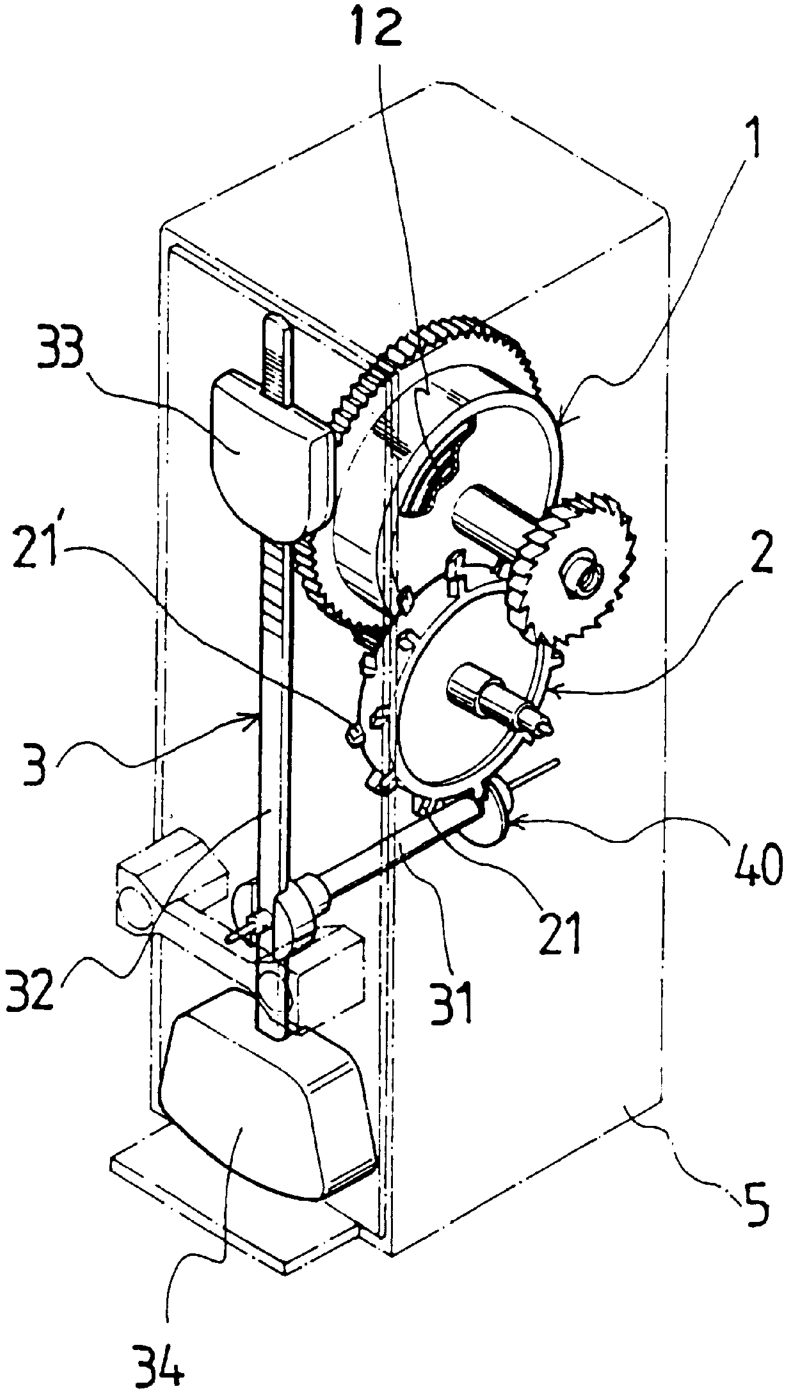
FIG. 1 (PRIOR ART)
FIG. 1 is a perspective view of a metronome according to the prior art.
Figure 2:
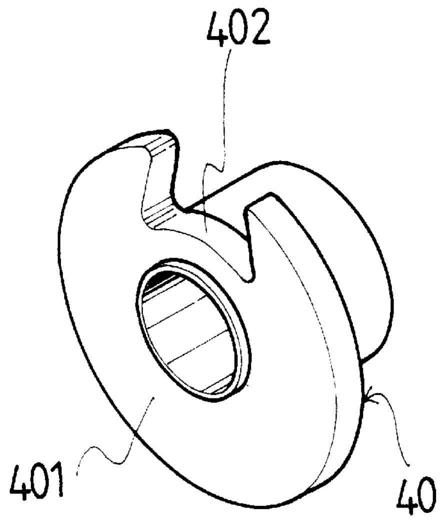
FIG. 2 (PRIOR ART)
FIG. 2 is a perspective view of an actuating member for a metronome according to the prior art.
Figure 3:
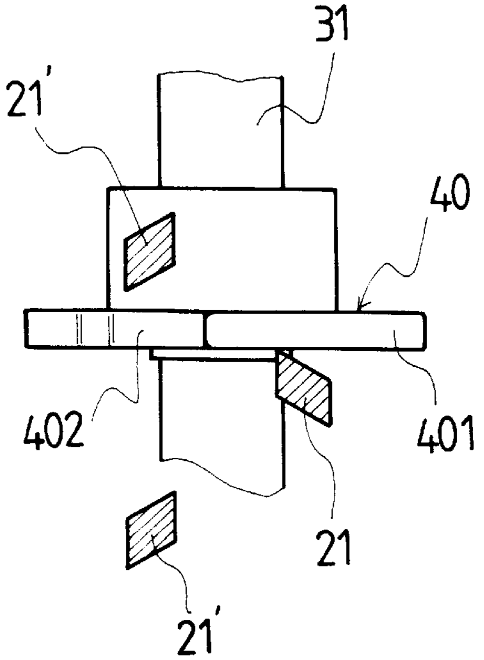
FIG. 3 (PRIOR ART)
FIG. 3 is an enlarged view of a part of FIG. 1, showing the actuating member fitted with the sloping teeth of the escapement wheel.
Figure 4:
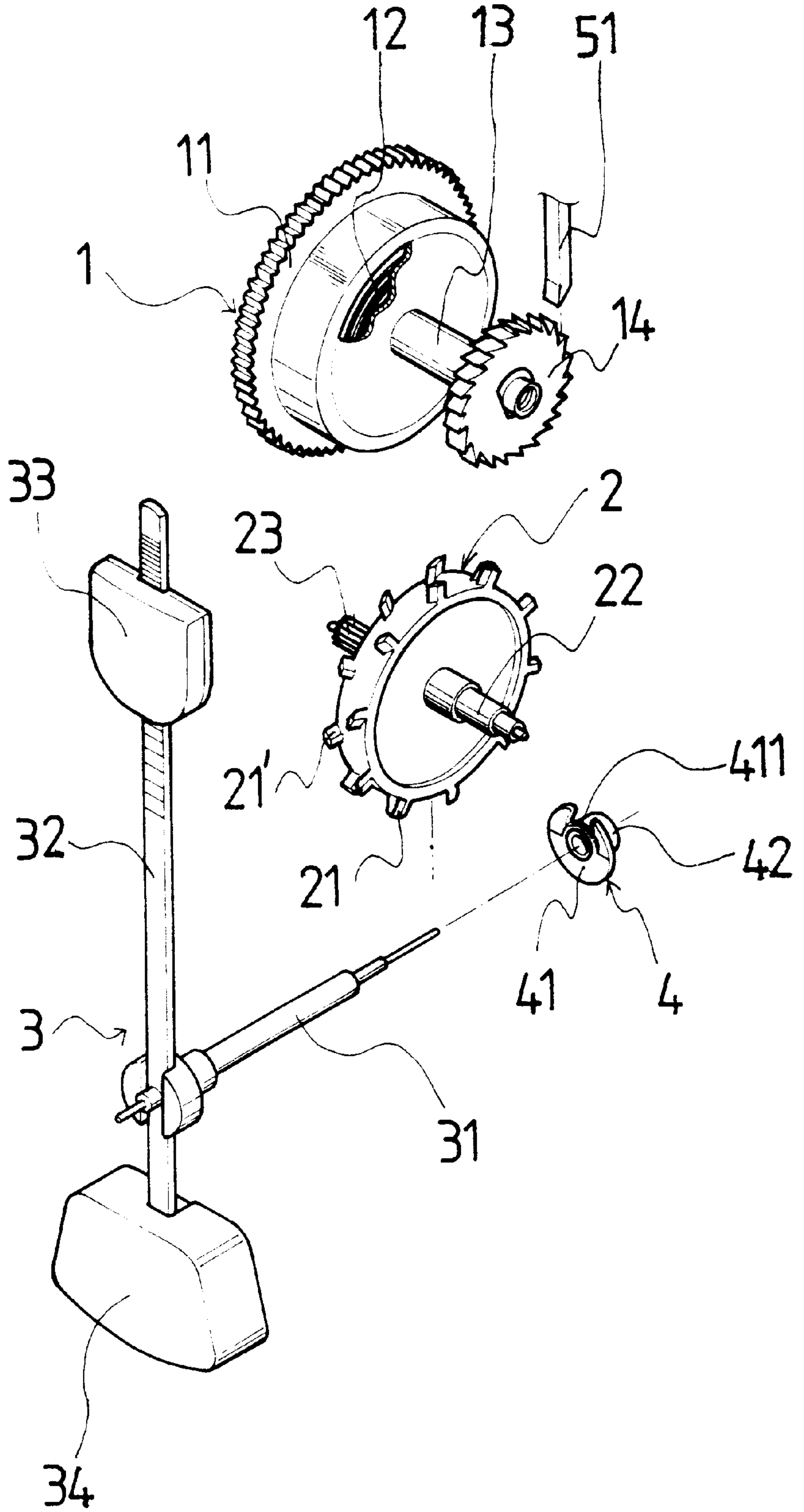
FIG. 4 is an exploded view of the present invention (the case excluded).
Figure 7:
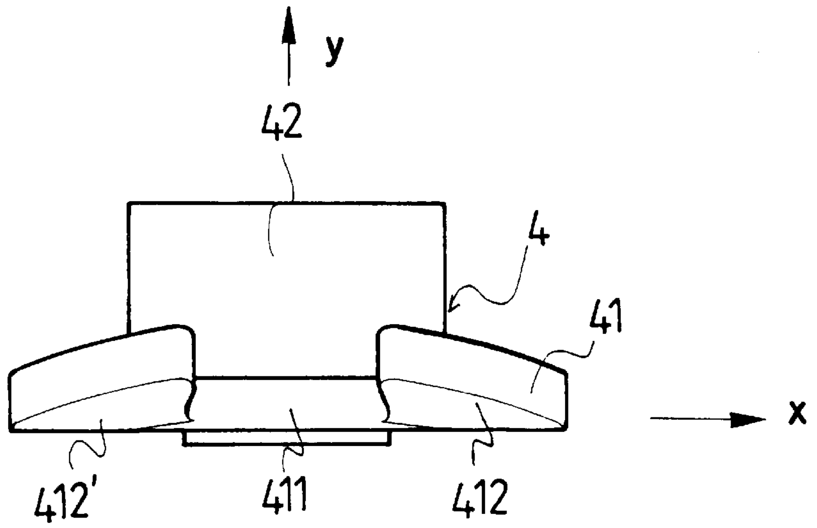
FIG. 7 is a top view of the actuating member shown in FIG. 5.
Figure 5:
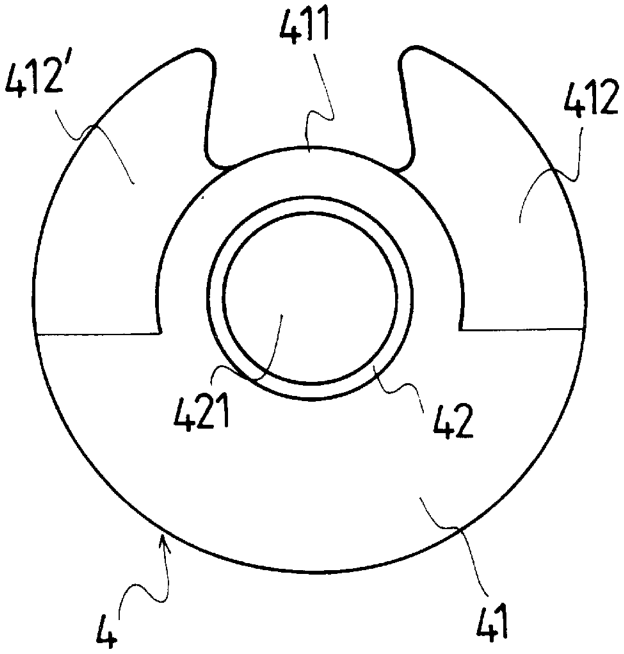
FIG. 5 is a front views of the actuating member for the metronome according to the present invention.
Figure 6:
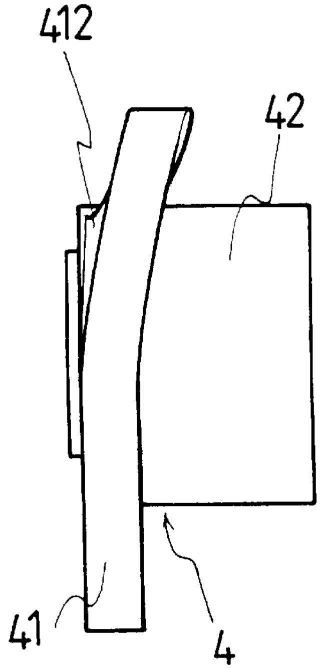
FIG. 6 is a right side view of the actuating member shown in FIG. 5.

Referring to FIG. 4, a metronome in accordance with the present invention is generally comprised of a driving, mechanism 1, an escapement wheel 2, an oscillating shaft 3, and an actuating member 4.

The driving mechanism 1 is turned by the user to preserve energy for operating the metronome, comprised of a hollow drive gear 11 and a spiral power spring 12 mounted in the hollow drive gear 11. The drive gear 11 and the spiral power spring 13 are securely mounted on one end of an axle 13. The axle 13 has an opposite end securely mounted with a ratchet 14. The ratchet 14 is fitted with a pawl 51 for one way rotation.

The escapement wheel 2 comprises two staggered rows of slopped teeth 21 and 21' arranged around its periphery, a fixed center wheel shaft 22, and a driven gear 23 securely mounted on one end of the fixed center wheel shaft 22 and meshed with the drive gear 11 of the driving, mechanism 1 for enabling the escapement wheel 2 to be rotated by the driving mechanism 1.

The oscillating shaft 3 is comprised of an axle 31, a pendulum bar 32, a sliding weight 33, and a fixed weight 34. The pendulum bar 32 is a narrow, flat, graduated bar perpendicularly fixed to one end of the axle 31. The fixed weight 34 is securely mounted on the bottom end of the pendulum bar 32 below the elevation of the axle 31. The sliding weight 33 mounted on the pendulum bar 32, and adjusted to the desired elevation above the axle 31.

The actuating member 4 (see FIGS. from 5 through 8) is comprised of a copper bushing 42, and a circular plate 41 securely mounted oil one end of the copper bushing 42. The circular plate 41 comprises a peripheral notch 411, and two sloping portions 412 and 412' symmetrically disposed at two opposite sides of the peripheral notch 411. The sloping portions 412 and 412' respectively tilted inwards in X-axis direction and sloping backwards in Y-axis direction. The copper bushing 42 has an axial center through hole 421 press-fitted onto one end of the axle 31 remote from the pendulum bar 32. When installed, the peripheral notch 411 of the circular plate 41 is fitted with the slopped teeth 21 and 21' of the escapement wheel 2.

The arrangement of the driving mechanism 1, the escapement wheel 2 and the oscillating shaft 3 is same as the prior art design, therefore it works in beating time. This arrangement is not within the scope of the present invention. The main feature of the present invention is the design of the actuating member 4. When the user operates the driving mechanism 1 to release the spiral power spring 12, the drive gear 11 is forced by the spiral power spring 12 to turn the escapement wheel 2 in one direction. During the rotary motion of the escapement wheel 2, the staggered rows of slopped teeth 21 and 21' intermittently strike the two sloping portions 412 and 412' of the circular plate 41 of the actuating member 4 (see FIGS. 9 and 10), thereby causing a clear striking sound to be produced intermittently at a constant time internal.

Figure 9:
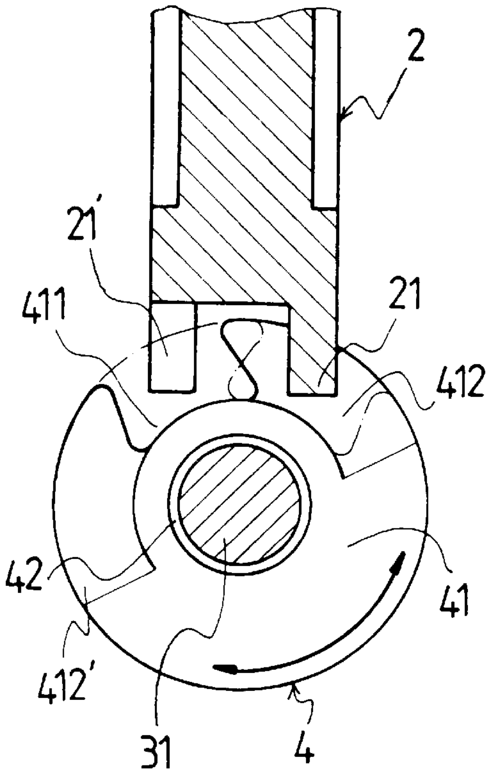
FIG. 9 is a schematic drawing showing the actuating member fitted with the escapement wheel according to the present invention.
Figure 10:
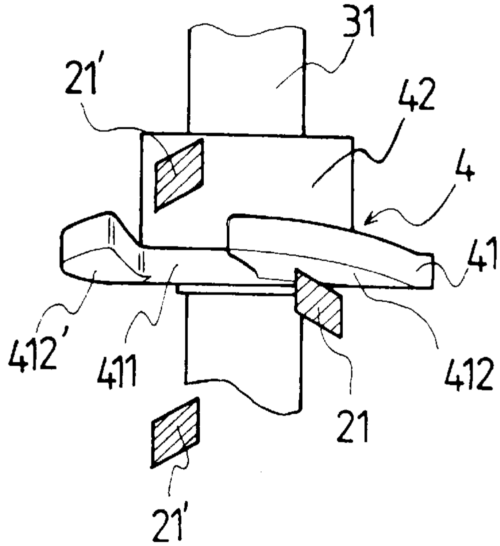
FIG. 10 is a schematic drawing showing one sloping tooth touched one sloping portion of the actuating member according to the present invention.
Figure 8:
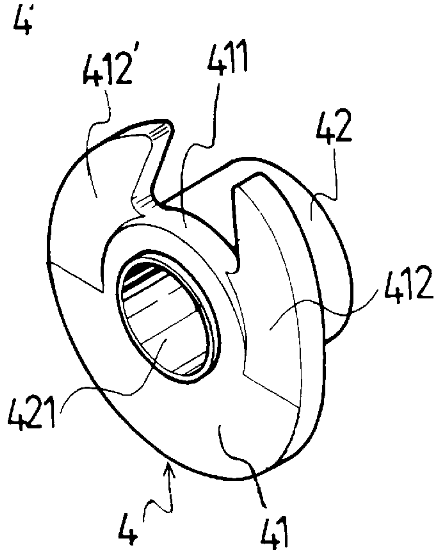
FIG. 8 is an oblique elevation of the actuating member shown in FIG. 5.

Referring to FIGS. 4, 9 and 10. when the sliding weight 33 is adjusted upward toward the top limit position at the pendulum bar 32, the moment of arm is relatively increased, and therefore the oscillating speed of the pendulum bar 32 is relatively slowed down. On the contrary, when the sliding weight 33 is adjusted downwards toward the axle 31, the oscillating speed of the pendulum bar 32 is relatively accelerated. When the sliding weight 33 is adjusted to the top limit position at the pendulum bar 32, the pendulum bar 32 can still be effectively oscillated at a low speed. Because the sloping portions 412 and 412' of the circular plate 41 of the actuating member 4 and the teeth 21 and 21' of the escapement wheel 2 respectively slope in one direction, a component of force is produced to push the circular plate 41 sideways when the teeth 21 or 21' touch one sloping portion 412 or 412'. When passing the peripheral notch 411, the teeth 21 or 21' push the corresponding sloping portion 412 or 412' sideways again in the same direction. Thereafter, a component of force is produced to push the circular plate 41 sideways in the reversed direction when the other row of teeth 21' or 21 touches the other sloping portion 412' or 412. When passing the peripheral notch 411, the teeth 21' or 21 push the corresponding sloping portion 412' or 412 farther, and therefore time-beating cycle is completed.

While only one embodiment of the present invention has been shown and described it will be understood that various modifications and changes could be made thereunto without departing from the spirit and scope of the invention disclosed.

What the invention claimed is:

1. A metronome comprising an oscillating shaft, an escapement mechanism formed of an actuating member and an escapement wheel having two staggered rows of sloping teeth around the periphery of said escapement wheel, and a driving mechanism operated by the user to rotate said escapement wheel, causing said oscillating shaft be turned back and forth with said actuating member, wherein said actuating member comprises a copper bushing fixedly coupled to a part of said oscillating shaft, and a circular plate securely mounted on one end of said copper bushing, said circular plate comprising a peripheral notch fitted with the sloping teeth of said escapement wheel, and two sloping portions symmetrically disposed at two opposite sides of said peripheral notch, said sloping portions respectively tilted inwards in X-axis direction and sloping backwards in Y-axis direction.

* * * * *